June 7, 1927.                                              1,631,433
F. R. SIMMS
YIELDING ROTARY DRIVING MECHANISM
Filed July 29, 1924

INVENTOR:
FREDERICK RICHARD SIMMS,
by Edward Williams
Atty.

Patented June 7, 1927.

1,631,433

UNITED STATES PATENT OFFICE.

FREDERICK RICHARD SIMMS, OF LONDON, ENGLAND.

YIELDING ROTARY DRIVING MECHANISM.

Application filed July 29, 1924, Serial No. 728,990, and in Great Britain August 10, 1923.

This invention relates to yielding rotary driving mechanism in which driving shock is absorbed by a resilient cushioning device carried by either the driving or driven member and bearing against a surface on the other member. The invention is particularly applicable to end-to-end and Cardan shaft couplings, but may be used between a wheel or the like and a shaft, or in any similar situation.

According to the invention, the driving torque is transmitted through a pneumatic cushioning device by subjecting the latter to a force which produces sheer stress in the material of the cushioning device.

The cushioning device used in my invention consists of an annulus of tubular cross section somewhat similar to a pneumatic automobile tire. In the present invention lugs formed integrally with the tube are used for attachment to the driving and driven members, as distinguished from my prior U. S. Patent No. 610,002, dated August 30, 1898. These lugs are secured to the driving or driven members of the coupling or both.

In the drawings I have shown three modifications of the invention as applied to the Cardan shaft of a motor vehicle.

Figure 1:
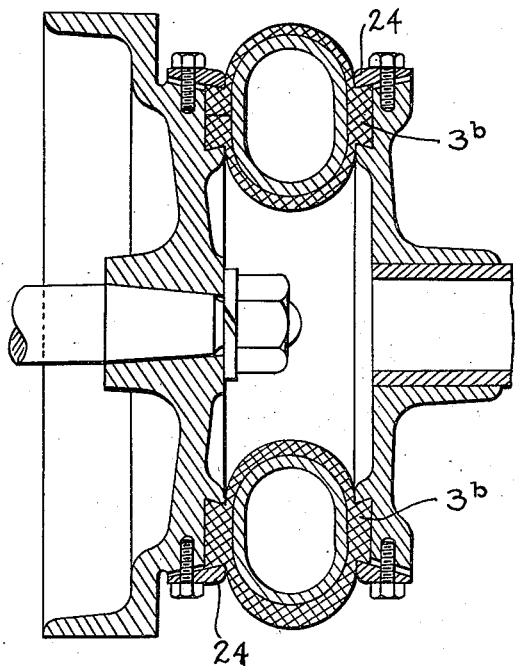
Figure 1 shows a modification of my invention in which axially extending cylindrical lugs are provided upon the sides of a split casing, the split being located through the center of one of the lugs.

In Figure 1 of the drawing the axially extending cylindrical lugs 3$^b$ are of dovetail cross section and are clamped by means of plates 24 to the driving and driven members without passing the clamping bolts through the lugs. It will be noticed in connection with this modification that since the split or opening in the outer casing is provided through one of these lugs that no additional securing means is required to hold the casing intact.

Figure 2:
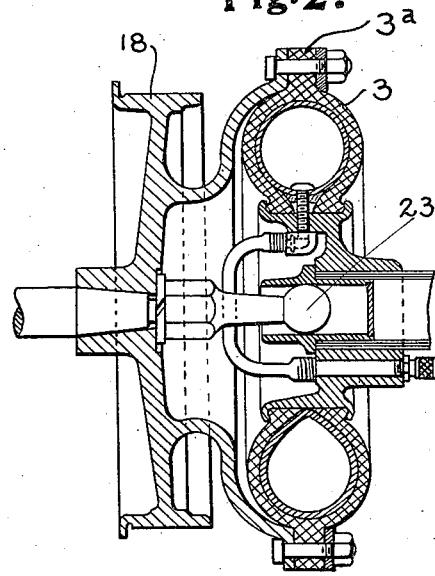
Figure 2 shows a coupling having a beading similar to the usual type of tire and having a radially extending lug for coupling to the driving or driven member.

In Figure 2 of the drawing the cushioning device 3 is shown having a radially extending lug 3$^a$, which is adapted to be engaged by a flange formed upon the member 18 carried by the driving member. The inner periphery of the cushioning device 3 in this modification is provided with a split opening having the edges of said opening beaded in a manner similar to the standard practice in tire construction, and the driven member is provided with a rim having clincher sides which engage these beadings, as is customary with tires built in this manner. An inner tube is provided within the cushioning device 3 and suitable valve means is also provided for the purpose of inflating the inner tube. The driving member is provided with a projecting member having a ball 23 which rides within a socket formed in the driven member, the ball 23 in this case serving to maintain the driving and driven members against radial displacement at the coupling.

Figure 3:
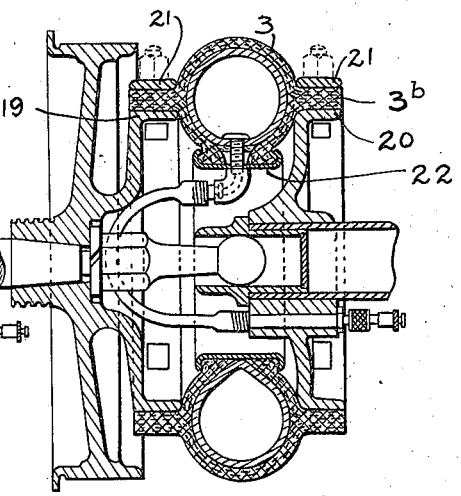
Figure 3 shows a coupling in accordance with my invention having oppositely disposed axially extending cylindrical lugs formed upon the sides of the pneumatic coupling.

In Figure 3 the cushioning device 3 is built in a manner similar to that shown in Figure 2, except that instead of a single radially extending lug, a plurality of axially extending cylindrical lugs 3$^b$ are provided on its sides. One of these lugs engages a flange 19 formed upon the driving member and the other engages a flange 20 formed upon the driven member and plates 21 are provided for the purpose of clamping the lugs 3$^b$ to the flanges 19 and 20. Holes are provided through the flanges 19 and 20 and bolts are passed through these holes, the lug 3$^b$ and the plates 21 for the purpose of securing the parts together.

In this modification of my invention I also provide a dummy rim 22 having clincher edges for the purpose of engaging the beading of the tire and maintaining the same intact when inflated. This rim is provided with an opening through which suitable means may be inserted for inflating the inner tube to any desired pressure.

Whilst this invention has been described as applied to an end to end shaft coupling, it will be understood that it is applicable wherever it is desired to transmit rotary motion from one member to another with a yielding or resilient drive.

Having now particularly described and ascertained the nature of my invention and in what manner the same is to be performed, I declare that what I claim is:—

1. Yielding rotary driving mechanism comprising a driving member, a driven member, and a pneumatic cushioning means interposed between and positively secured to said members and placed in sheer stress when transmitting a driving torque from one member to the other, said cushioning means comprising a unitary outer flexible casing and an inflatable inner tube.

2. Yielding rotary driving mechanism comprising a driving member, a driven member, and a unitary annular cushioning device through which driving torque is transmitted in a circumferential direction having oppositely projecting lugs which are secured to the driving and driven members.

3. A resilient shaft coupling having an annular cushioning device of tubular cross section interposed between the driving and driven members, in which the cushioning device is provided with circumferential lugs formed integrally therewith and secured to the driving and driven members.

4. A resilient shaft coupling having an annular cushioning means of tubular cross section interposed between the driving and a driven member, axially extending cylindrical lugs integrally formed upon said annular cushioning means, and adapted to engage said driving and driven members.

5. A resilient shaft coupling having an annular cushioning means of tubular cross section interposed between a driving and a driven member, axially extending cylindrical lugs integrally formed upon said annular cushioning means and adapted to engage said driving and driven members, and a beading formed upon the inner periphery of said cushioning means adapted to support a dummy rim when said pneumatic cushioning means is inflated.

6. A flexible coupling for axially aligned driving and driven shafts, comprising a unitary annular flexible casing, means provided upon said casing and adapted to be secured to and transmit power from said driving member to said driven member, and an inflatable inner tube within said casing adapted to maintain the same in working relation with said driving and driven shafts.

In witness whereof, I have hereunto set my hand this second day of May, 1924.

FREDERICK RICHARD SIMMS.